United States Patent
Burns et al.

(10) Patent No.: US 7,124,309 B2
(45) Date of Patent: Oct. 17, 2006

(54) METHOD, SYSTEM, AND APPARATUS FOR AN EFFICIENT POWER DISSIPATION

(75) Inventors: James S. Burns, Cupertino, CA (US); Devadatta V. Bodas, Federal Way, WA (US); Stefan I Rusu, Sunnyvale, CA (US); Sudhir Muthyalapati, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 447 days.

(21) Appl. No.: 10/624,366

(22) Filed: Jul. 21, 2003

(65) Prior Publication Data

US 2005/0022037 A1 Jan. 27, 2005

(51) Int. Cl.
G06F 1/26 (2006.01)
G06F 1/32 (2006.01)

(52) U.S. Cl. .................. 713/300; 713/320; 713/322
(58) Field of Classification Search .............. 713/300, 713/320, 322
See application file for complete search history.

(56) References Cited

U.S. PATENT DOCUMENTS

| 5,774,704 | A * | 6/1998 | Williams ............... 713/501 |
| 5,914,681 | A * | 6/1999 | Rundel ................. 341/135 |
| 6,281,727 | B1 * | 8/2001 | Hattori ................. 327/156 |
| 6,845,456 | B1 * | 1/2005 | Menezes et al. ......... 713/320 |
| 2002/0073351 | A1 * | 6/2002 | Oh ..................... 713/500 |

* cited by examiner

Primary Examiner—Lynne H. Browne
Assistant Examiner—Stefan Stoynov
(74) Attorney, Agent, or Firm—Michael J. Nesheiwat

(57) ABSTRACT

A processor that includes a digital throttle to monitor the activity of the execution pipeline and to change a frequency of a first or second PLL clock within a single clock cycle based on a power state.

7 Claims, 5 Drawing Sheets

METHOD, SYSTEM, AND APPARATUS FOR AN EFFICIENT POWER DISSIPATION

RELATED APPLICATION

Although the scope of the claimed subject matter is not limited in this respect, it is noted that some embodiments may include subject matter from the following co-pending applications: a first patent application with a Ser. No. of 10/041,013, filed on Dec. 28, 2001 and with a Title of "Multiple Mode Power Throttle Mechanism", and assigned to the same assignee; and a second patent application with a Ser. No. of 10/041,092, filed on Dec. 28, 2001 and with a Title of "Digital Throttle for Multiple Operating Points", and assigned to the same assignee.

BACKGROUND

1. Field

The present disclosure pertains to the field of power management. More particularly, the present disclosure pertains to a new method, system and apparatus for efficiently switching between multiple power states for an integrated device.

2. Description of Related Art

Power management schemes allow for reducing power consumption for various types of and systems and integrated devices, such as, servers, laptops, processors and desktops. Typically, software methods are employed for systems and integrated devices to support multiple power states for optimizing performance based at least in part on the Central Processing Unit (CPU) activity.

However, the present software methods for supporting multiple power states have a significant time penalty (overhead) for switching between the power states. For example, the time penalty may approach several million-clock cycles. Furthermore, the present sample rates of the processor are limited due to the overhead associated with the software methods. Typically, the sample rate is 10 ms. Furthermore, there is only limited information on the processor's state that is available, such as, whether the processor is idle or active.

BRIEF DESCRIPTION OF THE FIGURES

The present invention is illustrated by way of example and not limitation in the Figures of the accompanying drawings.

DETAILED DESCRIPTION

The following description provides method, system, and apparatus for an efficient multiple power state configurations. In the following description, numerous specific details are set forth in order to provide a more thorough understanding of the present invention. It will be appreciated, however, by one skilled in the art that the invention may be practiced without such specific details. Those of ordinary skill in the art, with the included descriptions, will be able to implement appropriate logic circuits without undue experimentation.

Various embodiments disclosed allow for efficiently detecting CPU utilization, obtaining more processor information to efficiently determine when to switch between power states, reducing the overhead of switching between power states, and allowing for a higher power state change rate.

In one embodiment, a dual PLL schematic is employed to efficiently support multiple power states with minimal overhead. Also, another embodiment allows for a digital sensor to monitor the CPU utilization. For example, the digital sensor monitors the CPU utilization and assigns different weights to different functional units based on the priority of the function unit. The related applications discuss the digital sensor in more detail.

In one embodiment, the claimed subject matter facilitates efficient power dissipation by switching to a power state based at least in part on the processor utilization. For example, the claimed subject matter analyzes the processor utilization. Subsequently, the claimed subject matter allows for a processor to initially have a first power state and allows for switching to a second power state based at least in part on increased processor utilization with an overhead penalty of only one core clock cycle In contrast, the prior art of software power management requires a significant overhead, such as, several million-clock cycles. Also, the prior art typically transitions from a high power state to a lower power state.

In one embodiment, the first power state utilizes less power than the second power state.

Figure 1:
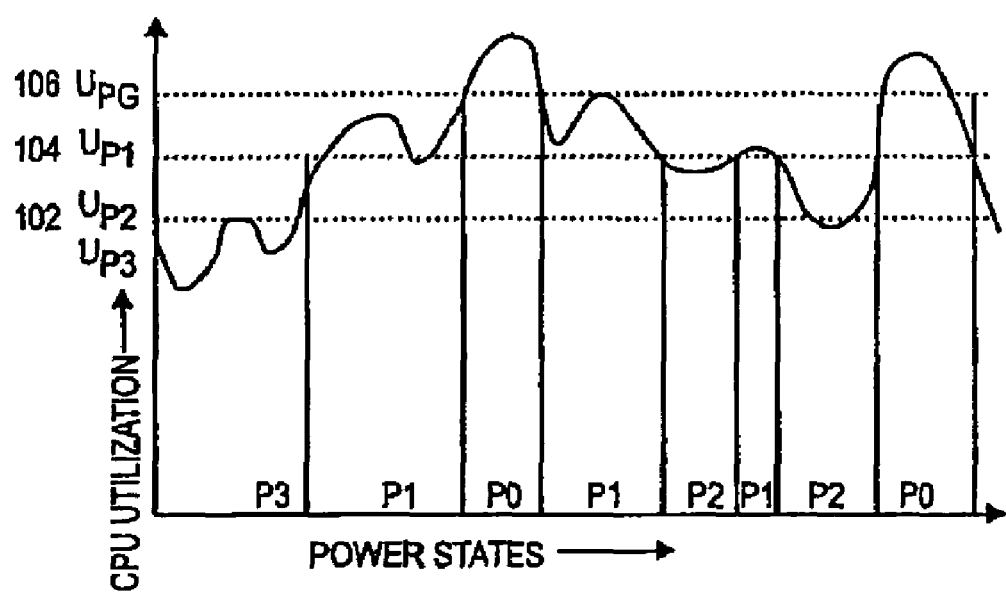
FIG. 1 illustrates a chart to depict CPU utilization versus multiple power states in accordance with one embodiment.

FIG. 1 depicts CPU utilizations vs. multiple power states as utilized in one embodiment. The x-axis depicts power states while the y-axis depicts CPU activity/utilization. As the CPU initialization exceeds the vertical line depicted as line 106, the power state P0 is enabled to support the processor's increased activity. In contrast, as the CPU utilization decreases to a line 102, a lower power state such as P3 may be utilized.

Figure 2:
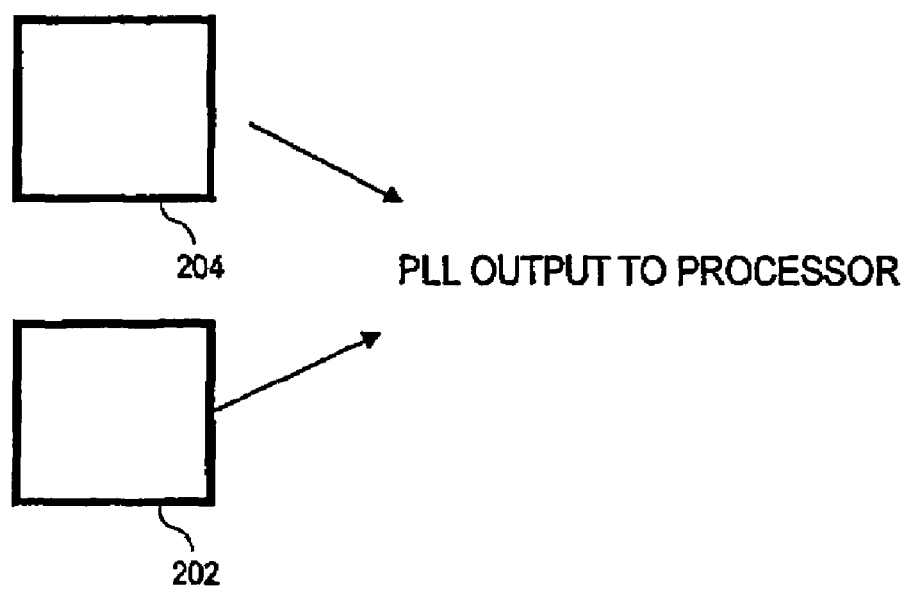
FIG. 2 illustrates an apparatus in accordance with one embodiment.

FIG. 2 illustrates an apparatus in accordance with one embodiment. In one embodiment, the apparatus comprises two phase locked loops (PLLs) to support at least two power states. The PLLs is are depicted as 202 and 204. As previously described, the related applications further describe the PLL configurations. In one embodiment, the PLLs are similar in circuit structure and support two power states. For example, the PLL 202 supports a first power state and PLL 204 supports a second power state, wherein the second power state allows for higher power consumption to support an increase in processor utilization with respect to the first power state.

However, the claimed subject matter is not limited to two power states. For example, it supports more than two power states by allowing for each PLL to have different voltage and frequencies (which is discussed further in connection with FIG. 3). As the frequency or voltage is changed, it might require a time penalty of 4–5 μs in one embodiment to allow for PLL relock.

Figure 3:
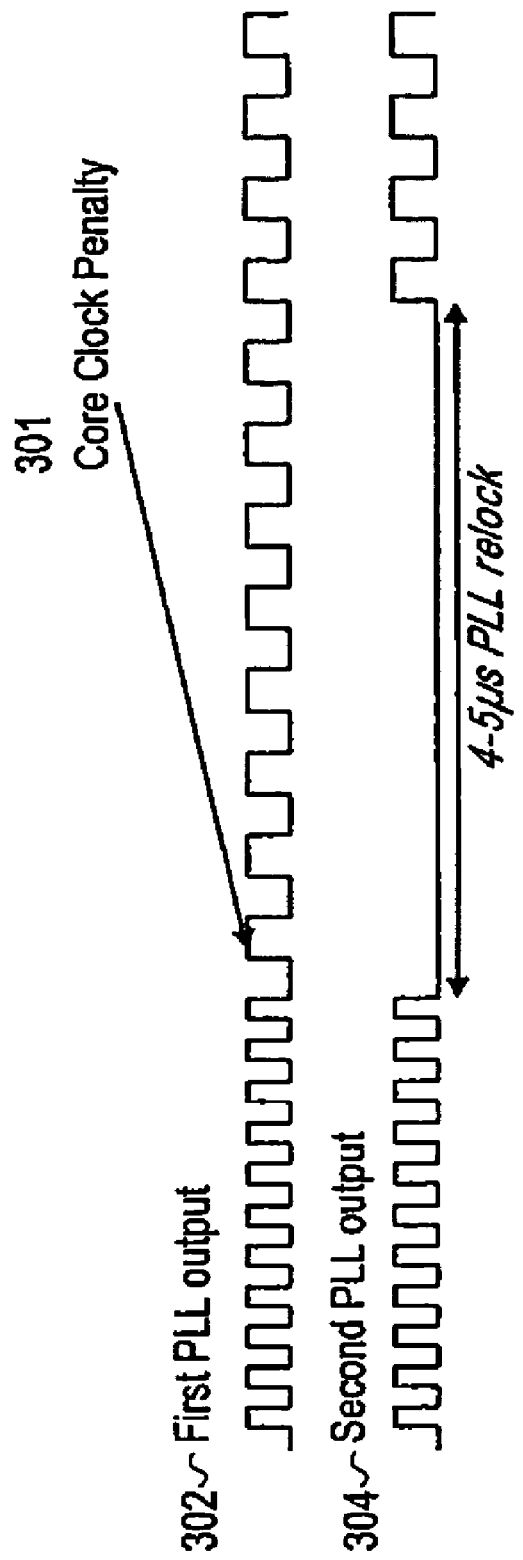
FIG. 3 illustrates a timing diagram utilized in one embodiment in connection with FIG. 2.

FIG. 3 illustrates a timing diagram utilized in one embodiment in connection with FIG. 2. A first timing waveform 302 depicts an output of a first PLL and a second timing waveform 304 depicts an output of a second PLL. For example, the first timing waveform 302, specifically, arrow 301, allows for a different frequency for a different power state, but incorporates a single core clock penalty as overhead. Also, timing waveform 304 depicts a PLL relock time period. In one embodiment, the relock time is 4–5 us. Thus, the claimed subject matter facilitates a dual PLL apparatus to achieve a single core clock penalty for different frequencies for different power states.

Figure 4:
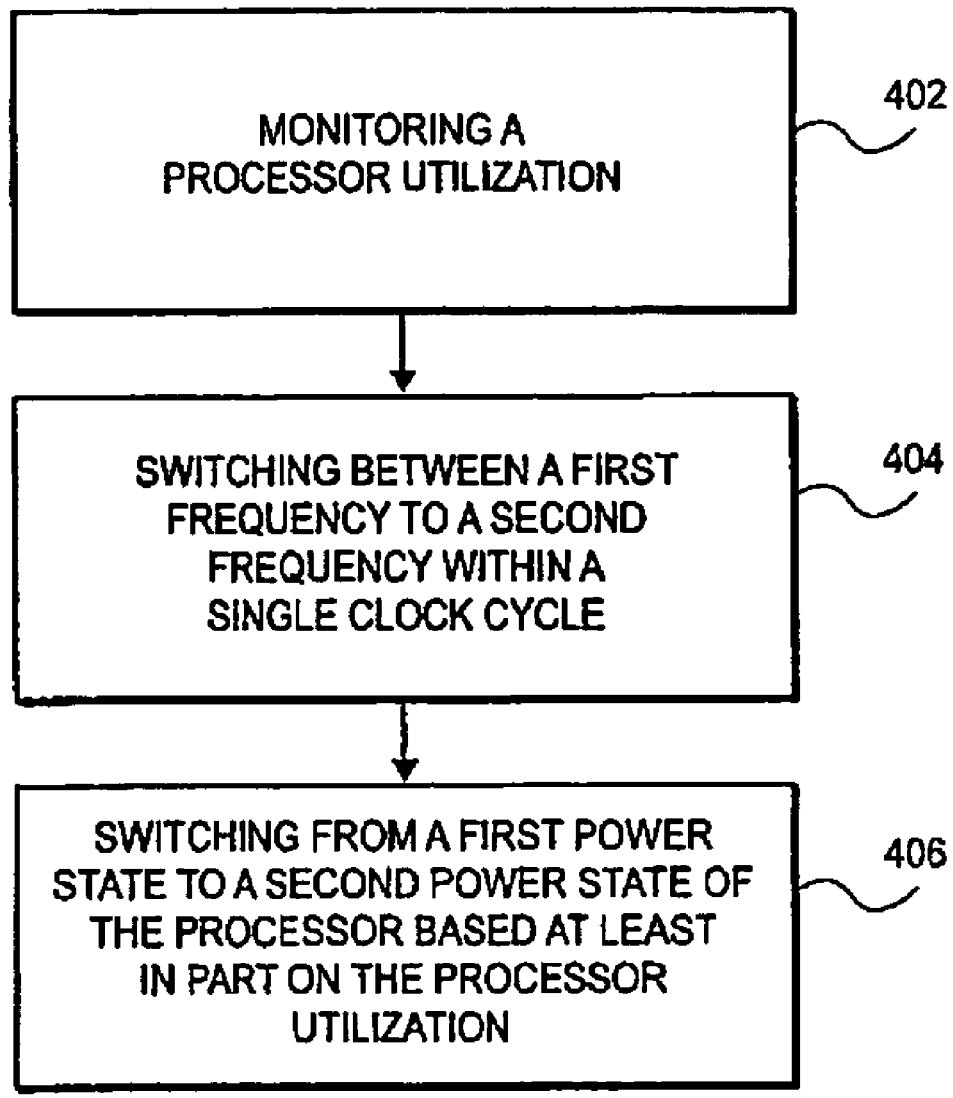
FIG. 4 illustrates a flowchart for a method in accordance with one embodiment.

FIG. 4 illustrates a flowchart for a method in accordance with an embodiment. As previously described, the related applications discuss the processor utilization and digital throttle in more detail.

The flowchart supports multiple power states by monitoring processor utilization, as illustrated by block 402. Based on the processor utilization, the claimed subject matter allows for switching between a first and second power state. For example, in one embodiment, the second power state utilizes more power consumption to support an increase in processor utilization. Thus, the first power state utilizes less power than the second power state. Furthermore, the claimed subject matter allows for the processor to start with a first power state that utilizes a low or moderate amount of power consumption and switches to a different power state with an increase in processor's utilization to anticipate a higher amount of power consumption.

Figure 5:
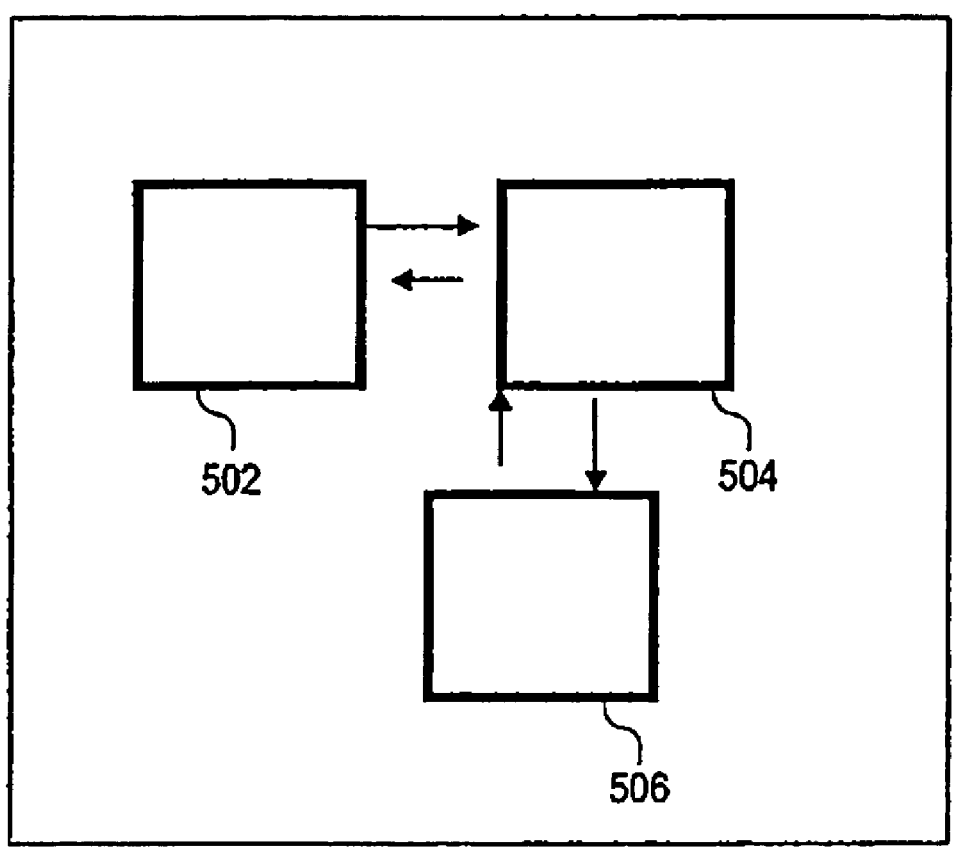
FIG. 5 illustrates a system in accordance with one embodiment.

FIG. 5 depicts a system in accordance with one embodiment. The apparatus in one embodiment is a processor 502 that incorporates a memory controller 504 that is coupled to a memory 506. For example, the processor incorporates a memory controller by allowing the processor to perform memory controller functions, thus, the processor performs memory controller functions. In contrast, in another embodiment, the processor 502 is coupled to a memory controller 504 that is coupled to a memory 506 and the processor does not perform memory controller functions. In both previous embodiments, the apparatus comprises the previous embodiments depicted in FIGS. 2–4 of the specification to efficiently support multiple power states.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method for supporting at least a first and second power state comprising:
   generating a first Phase Locked Loop(PLL) clock for a first power state;
   generating a second Phase Locked Loop clock for a second power state;
   adjusting a voltage and a frequency of a processor based at least in part on the first or second power state; and
   changing a frequency of the first Phase Locked Loop clock within a single clock cycle based on a processor utilization and changing a frequency of the second Phase Locked Loop clock after a completion of a PLL relock.

2. An system comprising:
   a processor with an execution pipeline;
   a DRAM, coupled to the processor;
   [an execution pipeline;]
   a digital throttle to estimate a power state, responsive to activity of the execution pipeline;
   a clock unit to generate a first Phase Locked Loop(PLL) clock for a first power state and a second Phase Locked Loop clock for a second power state; adjusting a voltage and a frequency of a processor based at least in part on the first or second power state and to change a frequency of the first Phase Locked Loop clock within a single clock cycle based on a processor utilization and to change a frequency of the second Phase Locked Loop clock after a completion of a PLL relock.

3. The system of claim 2 wherein the digital throttle comprises an activity monitor to provide an activity level response to activity states of units of the execution pipeline.

4. A processor comprising:
   an execution pipeline;
   a digital throttle to estimate a power state, responsive to activity of the execution pipeline; and
   a clock unit to generate a first Phase Locked Loop(PLL) clock for a first power state and a second Phase Locked Loop clock for a second power state,
   and to adjust a voltage and a frequency of a processor based at least in part on the first or second power state and to change a frequency of the first Phase Locked Loop clock within a single clock cycle based on a processor utilization and to change a frequency of the second Phase Locked Loop clock after a completion of a PLL relock.

5. The processor of claim 4 wherein the digital throttle comprises an activity monitor to provide an activity level response to activity states of units of the execution pipeline.

6. A clock generation unit for a processor of claim 5 wherein the clock generation unit gates at least one clock to the processor to control power delivery of a functional unit of the processor.

7. A clock generation unit for a processor comprising:
   the clock generation unit to generate a first Phase Locked Loop(PLL) clock for a first power state and a second Phase Locked Loop clock for a second power state; adjusting a voltage and a frequency of a processor based at least in part on the first or second power state and to change a frequency of the first Phase Locked Loop clock within a single clock cycle based on the processor utilization and to change a frequency of the second Phase Locked Loop clock after a completion of a PLL relock.

* * * * *